(12) United States Patent
DeCanio

(10) Patent No.: US 11,099,047 B2
(45) Date of Patent: Aug. 24, 2021

(54) LIQUID OBSERVATION DEVICE

(71) Applicant: Paul Joseph DeCanio, Brentwood, NY (US)

(72) Inventor: Paul Joseph DeCanio, Brentwood, NY (US)

( * ) Notice: Subject to any disclaimer, the term of this patent is extended or adjusted under 35 U.S.C. 154(b) by 166 days.

(21) Appl. No.: 16/669,518

(22) Filed: Oct. 31, 2019

(65) Prior Publication Data

US 2021/0131852 A1    May 6, 2021

(51) Int. Cl.
*G01F 23/04*  (2006.01)

(52) U.S. Cl.
CPC ..................... *G01F 23/04* (2013.01)

(58) Field of Classification Search
CPC .. G01F 23/04; G01F 25/0061; G01F 25/0084; G01F 23/00; G01F 23/392; G01F 23/02; G01F 19/00
USPC .......... 33/731, 730, 729, 722; 73/1.73, 1.74, 73/114.55, 114.56, 115.02, 115.03, 73/115.04, 290 R, 291, 293, 298, 323, 73/334, 427, 428
See application file for complete search history.

(56) References Cited

U.S. PATENT DOCUMENTS

| | | | | |
|---|---|---|---|---|
| 1,264,143 A | * | 4/1918 | Bennet | B65D 90/48 73/293 |
| 1,926,945 A | * | 9/1933 | Hipp, Jr. | B60P 3/224 73/293 |
| 2,620,660 A | * | 12/1952 | Goldsmith | G01F 23/2922 73/293 |
| 3,780,582 A | * | 12/1973 | Ajero | G01F 23/50 73/320 |
| 4,099,332 A | * | 7/1978 | Jones, Jr. | G01F 23/00 33/729 |
| 4,451,986 A | * | 6/1984 | Jones, Jr. | G01F 23/0023 33/720 |
| 4,531,293 A | * | 7/1985 | Grinde | G01F 23/04 116/227 |

(Continued)

*Primary Examiner* — Justin M Jonaitis

(57) ABSTRACT

A liquid observation device having a clear body structure 1C which is a disc-like shape which on the top surface has a thumb support member 1A that includes symbol indicator marks 1B thereon, on the opposite side of the clear body structure 1C a mechanical seal surface 2B having a mechanical seal 2A thereto, which has threads 3A extending from the mechanical seal surface 2B to the bottom of the said clear body structure 1C which located on the bottom surface at the center a phosphorescent tube. member 5 having a vent hole 4 at the top, which extends vertically down from the clear body structure 1C, toward the end has tube indicator section 6 that extends in a downwardly-inclined outwardly spiral. The device is attached to the liquid storage vessel 8 by engagement of the threads in a clockwise direction which define matching threads and turned until the mechanical seal 2A is tight between the seal surface 2B and the liquid storage vessel 8, the phosphorescent tube member 5 indicator section 6 provides light and is submerged into the liquid 9, which the liquid 9 enters the tube entrance 7, the air vents out of the vent hole 4 permitting the liquid to rise up the tube that gives the observer visual observation as well as the liquid level in the liquid storage vessel which is observed through the clear body structure 1C, and by which the claimed invention functions.

2 Claims, 2 Drawing Sheets

(56) References Cited

U.S. PATENT DOCUMENTS

| | | | | |
|---|---|---|---|---|
| 5,025,569 A * | 6/1991 | Lalevee, Sr. | ............ | G01F 23/04 |
| | | | | 33/726 |
| 5,325,981 A * | 7/1994 | Klomhaus | .............. | B62D 25/24 |
| | | | | 116/227 |
| 5,992,037 A * | 11/1999 | Klotz | ....................... | G01F 23/04 |
| | | | | 123/196 R |
| 2008/0314141 A1 * | 12/2008 | Keith | ....................... | G01F 23/04 |
| | | | | 73/290 R |
| 2017/0342879 A1 * | 11/2017 | Lim, Jr. | .................. | G01F 23/04 |

* cited by examiner

LIQUID OBSERVATION DEVICE

BACKGROUND OF THE INVENTION

1. Field of the Invention

The invention relates generally to a device that permits observation and measurement of a liquid level inside a liquid storage vessel without removing the device, and requires no, mechanical, electrical, or magnetic systems.

2. Description of the Prior Art

Liquid observation inside a liquid storage vessel is not currently done or in fact never has been done and measurement technologies are of the mechanical, electrical and magnetic methods, which the disadvantages are disclosed in the following examples:
   a. Dipsticks are used for the purpose of liquid level measurement and have to be manually removed and wiped and re-inserted multiple times in order to measure the liquid level properly. The problems incurred with this mechanical method is inaccurate measurement, no observation of the liquid within the liquid storage vessel and, ambient impurities brought therein.
   b. Float type systems which operate by positioning a float type object between the liquid and the top of the storage vessel and attaching a mechanical device to record the position with a transmitter output. The problem is to calculate the floats exact position due to the unrested liquid surface, and no observation of the liquid within the liquid storage vessel.
   c. Magnetic fluid level measuring system which is similar to the float type method, but communicates with the liquid surface magnetically. Transmitters are used to location indication which can be converted into digital communication output. The problem that exists with this method is the chamber walls and auxiliary column must be constructed of a non-ferrous material, and incapable to observe the liquid within the storage vessel.

These methods are unable to observe the liquid in the storage vessel, measure the liquid levels without costly equipment, and must be maintained periodically to function properly. These problems are overcome by this invention.

3. Objects and Advantages

Several objects and advantages of the invention are:
   a. The invention is self-contained, requires no mechanical, electric, magnetic systems, and is maintenance free to achieve the expected results.
   b. Allows easy installation and removal from the liquid storage vessel.
   c. A method in which the observer can visually observe the liquid within the liquid storage vessel showing the condition of the liquid.
   d. The accurate measurement of the liquid level is achieved by the observer of the liquid in its natural state within the liquid storage vessel.
   e. To provide a light source to the inside of the liquid storage vessel.

SUMMARY OF THE INVENTION

The invention provides a method which makes it achievable to observe a liquid inside a liquid storage vessel which results in the condition of the liquid, and accurate measurement of the liquid level relative to the top and bottom of the liquid storage vessel.

It is an object of this invention to provide an inexpensive and easily manufactured means for visual observation of the condition, and accurate liquid level measurement within a liquid storage vessel.

It is another object of this invention to provide a fast, safe, and effortless means for installation, and removal to the liquid storage vessel.

It is yet another object of this invention for magnification to optically focus into the liquid storage vessel as required.

It is still yet another object of this invention to provide ambient light or emitted light after exposure to radiation in the liquid storage vessel means for liquid observation.

BRIEF DESCRIPTION OF THE DRAWINGS

The advantages of the invention will become apparent from the following details in connection with the drawings which.

DESCRIPTION OF THE PREFERRED EMBODIMENT

Figure 1:
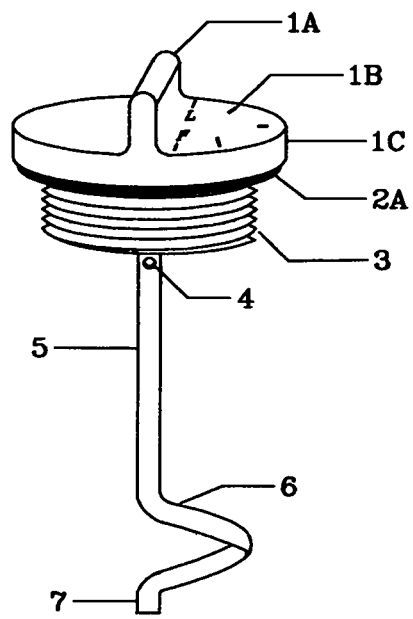
FIG. 1 is an elevation view showing an embodiment of the invention of the liquid observation device.
Figure 2:
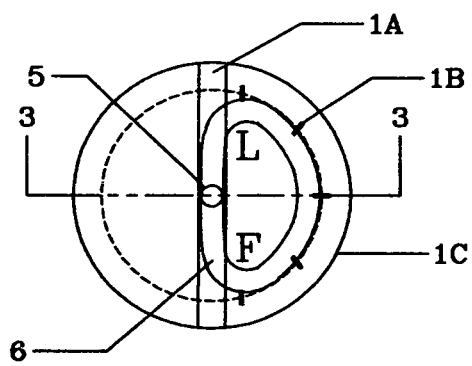
FIG. 2 is a top view showing an embodiment of the liquid observation device.
Figure 3:
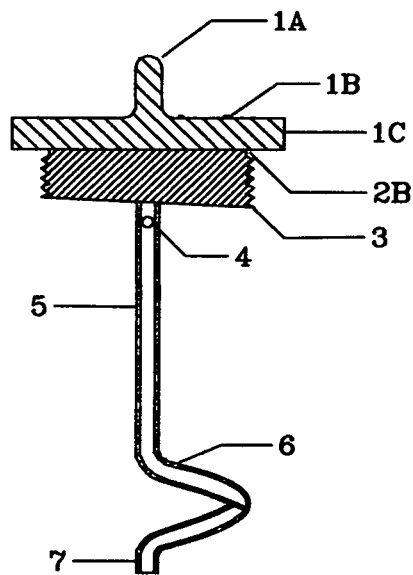
FIG. 3 is a sectional view, along section 3-3 of FIG. 2.
Figure 4A:
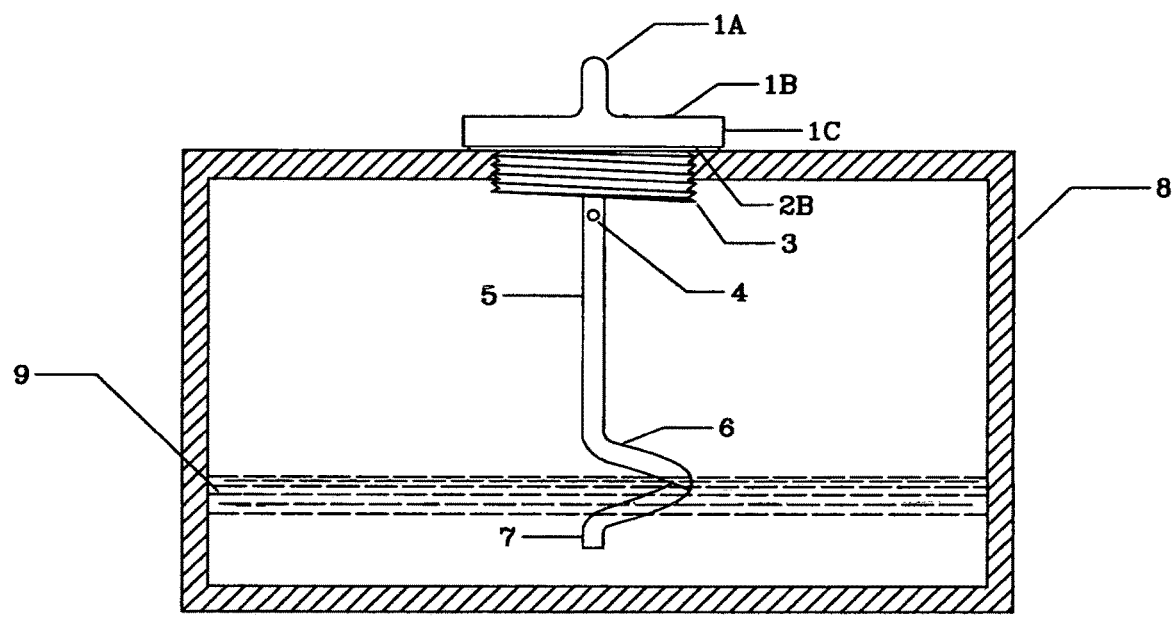
FIG. 4A is a vertical cutaway view of the means that is arranged inside the liquid storage vessel showing an embodiment of the liquid observation device installed therein observing the liquid condition and level.
Figure 4B:
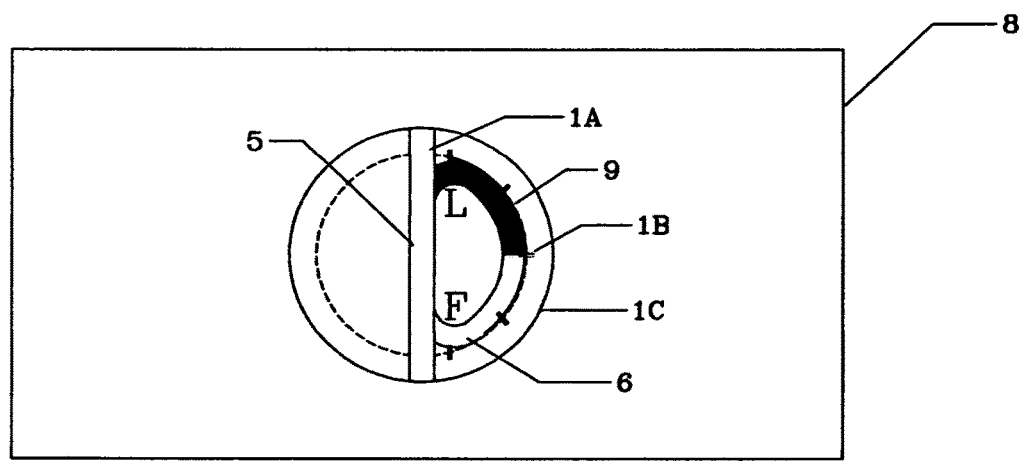
FIG. 4B is another top view showing an embodiment of the liquid observation device installed in a liquid storage vessel observing the liquid condition, and level measurement between L "low" and F "full".

Referring to FIGS. 1, 2, 3, 4A, and 4B, an embodiment of the invention is shown in which the liquid observation device is comprised of a clear body structure 1C having a disc-like shape, which has a thumb support 1A on the top surface with symbol indicator marks 1B thereto, which on the bottom of the clear body structure 1C a mechanical seal 2A which seals to the seal surface 2B and has threads 3 which extend from the mechanical seal surface 2B to the end of the clear body structure 1C and in the center of bottom surface has a clear phosphorescent tube member 5 attached thereto which extends longitudinally down having at the top a vent hole 4, which towards the bottom a tube indicator section 6 which downwardly-inclined outwardly spiral from the center axis of the clear body structure 1C in which the liquid enters the tube entrance 7 at the end of the clear phosphorescent tube member 5.

In this embodiment, a removable fasting means and liquid observation is shown in which the clear body structure 1C is threaded into the liquid storage vessel 8 by turning the thumb support member 1A in a clockwise direction which the threads 3 are engaged with matching threads of the liquid storage vessel 8. The tube indicator section 6 is extending downwardly-inclined outwardly spiral through the liquid 9 which the liquid 9 enters through the tube entrance 7 and air vents through the vent hole 4 permitting the liquid to rise up the clear phosphorescent tube member 5, means for visual observation of the liquid 9 through the clear body structure 1C which the condition is shown as a dark liquid 9, and level is measured in the storage vessel 8 with the symbol indicator marks 1B on the top of the clear body structure 1C is displayed between L and F Although the description above contains many distinctions, these should not be defined as limiting the scope of the invention but merely providing illustrations of some of the presently preferred embodiments of this invention. For example:

a. The body structure 1C can contain a small disc battery or solar to power a led light which would illuminate the liquid storage vessel.
b. The clear body structure 1C securing means of a rubber plug type.
c. Clear body structure 1C having a knurled outer-vertical section instead of a thumb support member 1A for installation and allowing a full 360° symbol indicator marks 1B around the top surface of the said clear body structure 1C which would focus on the 360° tube indicator section 6 through the liquid 9.

I claim:

1. A device for observation of the liquid inside a liquid storage vessel which permits visual access to the observer the liquid condition as well as the liquid level without removing the device from said liquid storage vessel comprising:

a. a body structure formed form a clear material comprising a disc shaped portion including on an external top surface a plurality of indicator marks and a permanent thumb support extending across a diameter, a bottom surface having a mechanical sealing surface with a mechanical seal and a tube member attached at the center of said bottom surface, said body structure including a plurality of threads extending from said bottom surface;
   b. said thumb support comprises a rectangular shape extending across said external top surface and protruding perpendicular to said top surface;
   c. said tube member comprises hollow tube having a body structure end connected to the center of said bottom surface and an opposite end, said body structure end of the tube has a vent hole, said tube member including a tube indicator section located between the body structure end and the opposite end which extends downwardly-inclined outwardly with respect to the longitudinal axis passing through the center of said body structure spiral which with a diameter smaller than the diameter of said disc shaped portion;
   d. thereby the device is attached to the liquid storage vessel by engagement of said plurality of threads with a plurality of matching threads located on the liquid storage vessel by rotation in a clockwise direction turned until the said mechanical seal is compressed between the storage vessel and said mechanical seal surface, said tube length is defined by the storage vessel relative to a top and a bottom surface of the liquid storage vessel;
   wherein when said body structure is attached to said liquid storage vessel a fluid is vented from the said tube member when a liquid rises inside the said tube member allowing a user to observe and measure a level the fluid liquid in the fluid liquid storage vessel without the removal of said body structure.

2. The device as recited in claim 1, which further comprises:

a. the body structure made of the clear material which provides magnification to optically focus for the observer to visually observe the liquid within the liquid storage vessel;
   b. the tube member made of a dear phosphorescent material for emitting light within the liquid storage vessel, said vent not producing a vacuum or positive pressure within the tube which allows the liquid to enter the tube for an accurate level reading, said tube indicator section in combination with said plurality of indicator marks indicates the liquid level in the liquid storage vessel to the observer through said clear body structure.

* * * * *